United States Patent
Huang et al.

(10) Patent No.: US 9,558,086 B2
(45) Date of Patent: Jan. 31, 2017

(54) SYSTEM ON CHIP WITH DEBUG CONTROLLER AND OPERATING METHOD THEREOF

(71) Applicant: ASPEED Technology Inc., Hsinchu (TW)

(72) Inventors: Hung-Ju Huang, Hsinchu (TW); Fu-Chou Hsu, Hsinchu (TW); Chung-Yen Lu, Hsinhu (TW)

(73) Assignee: ASPEED TECHNOLOGY INC., Hsinchu (TW)

(*) Notice: Subject to any disclaimer, the term of this patent is extended or adjusted under 35 U.S.C. 154(b) by 99 days.

(21) Appl. No.: 14/728,557

(22) Filed: Jun. 2, 2015

(65) Prior Publication Data
US 2016/0357651 A1    Dec. 8, 2016

(51) Int. Cl.
*G06F 11/00* (2006.01)
*G06F 11/22* (2006.01)
*G06F 13/42* (2006.01)

(52) U.S. Cl.
CPC ......... *G06F 11/221* (2013.01); *G06F 11/2205* (2013.01); *G06F 13/4282* (2013.01)

(58) Field of Classification Search
CPC .. G06F 11/2205; G06F 11/221; G06F 13/4282
See application file for complete search history.

(56) References Cited

U.S. PATENT DOCUMENTS

| | | | | |
|---|---|---|---|---|
| 6,125,448 A | * | 9/2000 | Schwan | G06F 1/266 713/300 |
| 6,219,697 B1 | * | 4/2001 | Lawande | H04L 29/12254 709/220 |
| 6,405,247 B1 | * | 6/2002 | Lawande | H04L 29/12254 709/220 |
| 2006/0245533 A1 | * | 11/2006 | Rostampour | G06F 13/385 375/377 |
| 2006/0248391 A1 | * | 11/2006 | Glover | G06F 11/3648 714/30 |
| 2008/0109581 A1 | * | 5/2008 | Pham | G06F 13/4045 710/58 |
| 2016/0080210 A1 | * | 3/2016 | Lai | H04L 41/12 709/224 |

* cited by examiner

*Primary Examiner* — Joshua P Lottich
(74) *Attorney, Agent, or Firm* — Muncy, Geissler, Olds & Lowe, P.C.

(57) ABSTRACT

A System on Chip (SOC) is disclosed. The SOC comprises a first UART controller, a second UART controller, a debug controller, a processor, a UART port, a first multiplexer and a second multiplexer. The first UART controller and the second UART controller have different baud rates. The UART port has a RxD pin coupled to a RxD pin of the second UART controller. The debug controller generates a control signal with a first state and checks whether a received data from the UART controller is equal to a keyword after power-up or a hardware reset. When the received data from the second UART controller is equal to the keyword, the debug controller generates the control signal with the second state, and starts parsing and executing at least one debug command from the second UART controller.

24 Claims, 6 Drawing Sheets

SYSTEM ON CHIP WITH DEBUG CONTROLLER AND OPERATING METHOD THEREOF

BACKGROUND OF THE INVENTION

Field of the Invention

The invention relates to System on Chips (SOCs), and more particularly, to a System on Chip (SOC) with a debug controller and operating method thereof.

Description of the Related Art

FIG. 1 is an exemplary diagram showing a conventional SOC 100. A SOC 100 includes a processor 110, a UART (universal asynchronous receiver/transmitter) controller 120, a SRAM 170, a DRAM controller 180 and a flash controller 190. Usually, the SOC 100 works with a separate DRAM 181 and a separate flash memory 191. The SOC 100 generally has two interfaces for debugging its embedded system, i.e., a JTAG interface for connecting to an ICE (in-circuit emulator) 160 and a UART (universal asynchronous receiver/transmitter) interface for connecting to a console 150. For example, a developer normally uses the ICE 160 via the JTAG port 140 to load programs into the embedded system, run them, step through them slowly, set execution breakpoints, and view and change data used by the system's software. However, the ICE 160 with the JTAG interface is not easy to use.

For debugging software, a simple text input/output console 150 is often sufficient. This can be handled by a simple UART connection 131 through a UART port 130 on the SOC 100 to a UART port (not shown) on the console 150 (e.g., a personal computer) so that the developer can display text messages and enter inputs using a terminal/console application. However, as any other computer system, SOCs are subject to crashes and other features of its various peripheral subsystems. In the event of a processor crash, the processor 110 stops functioning properly and thus it is impossible for the developer to collect information about the operating states of the embedded system through the UART connection and the processor 110. Accordingly, what is needed is a SOC and operating method to address the above-identified problems. The invention addresses such a need.

SUMMARY OF THE INVENTION

In view of the above-mentioned problems, an object of the invention is to provide a SOC with a debug controller, so that in the event of a processor crash, the debug controller of the SOC is capable of debugging its embedded system via a UART port.

One embodiment of the invention provides a System on Chip (SOC). The SOC comprises a first UART controller, a second UART controller, a debug controller, a UART port, a first multiplexer and a second multiplexer. The first UART controller and the second UART controller have different baud rates. The debug controller coupled to the second UART controller and a system bus generates a control signal with a first state and checks whether a received data from the second UART controller is equal to a keyword after power-up or a hardware reset. The UART port comprises a RxD pin and a TxD pin, and the RxD pin of the UART port is coupled to a RxD pin of the second UART controller. The first multiplexer couples the RxD pin of the UART port to the RxD pin of the first UART controller in response to the first state of the control signal, and couples a voltage terminal applied with a UART idle signal to the RxD pin of the first UART controller in response to a second state of the control signal. The second multiplexer couples a TxD pin of the first UART controller to the TxD pin of the UART port in response to the first state of the control signal, and couples a TxD pin of the second UART controller to the TxD pin of the UART port in response to the second state of the control signal. When the received data from the second UART controller is equal to the keyword, the debug controller generates the control signal with the second state, and starts parsing and executing at least one debug command from the second UART controller.

Another embodiment of the invention provides an operating method of a System on Chip (SOC). The SOC comprises a first UART controller, a second UART controller, a debug controller, and a UART port. The debug controller is coupled to the second UART controller and a system bus. A RxD pin of the UART port is coupled to a RxD pin of the second UART controller. The operating method comprises the steps of: setting a first baud rate of the first UART controller and a second baud rate of the second UART controller to different rates; coupling a RxD of the first UART controller to the RxD pin of the UART port; coupling a TxD of the first UART controller to a TxD pin of the UART port; checking whether a received data from the second UART controller is equal to a keyword by the debug controller; and, when the received data is equal to the keyword, applying a UART idle signal to the RxD pin of the first UART controller, coupling a TxD pin of the second UART controller to the TxD pin of the UART port, and starting parsing and executing at least one debug command from the second UART controller by the debug controller.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

As used herein and in the claims, the term "a," "an," "the" and similar terms used in the context of the present invention (especially in the context of the claims) are to be construed to cover both the singular and plural unless otherwise indicated herein or clearly contradicted by the context.

A feature of the invention is to include a debug controller in a SOC with a processor. Thus, in the event of a processor crash, the debug controller of the SOC is capable of debugging its embedded system via a UART port. Besides, the debug controller of the SOC is capable of updating its flash memory via the UART port and a flash controller even if no crash occurs.

Figure 1:
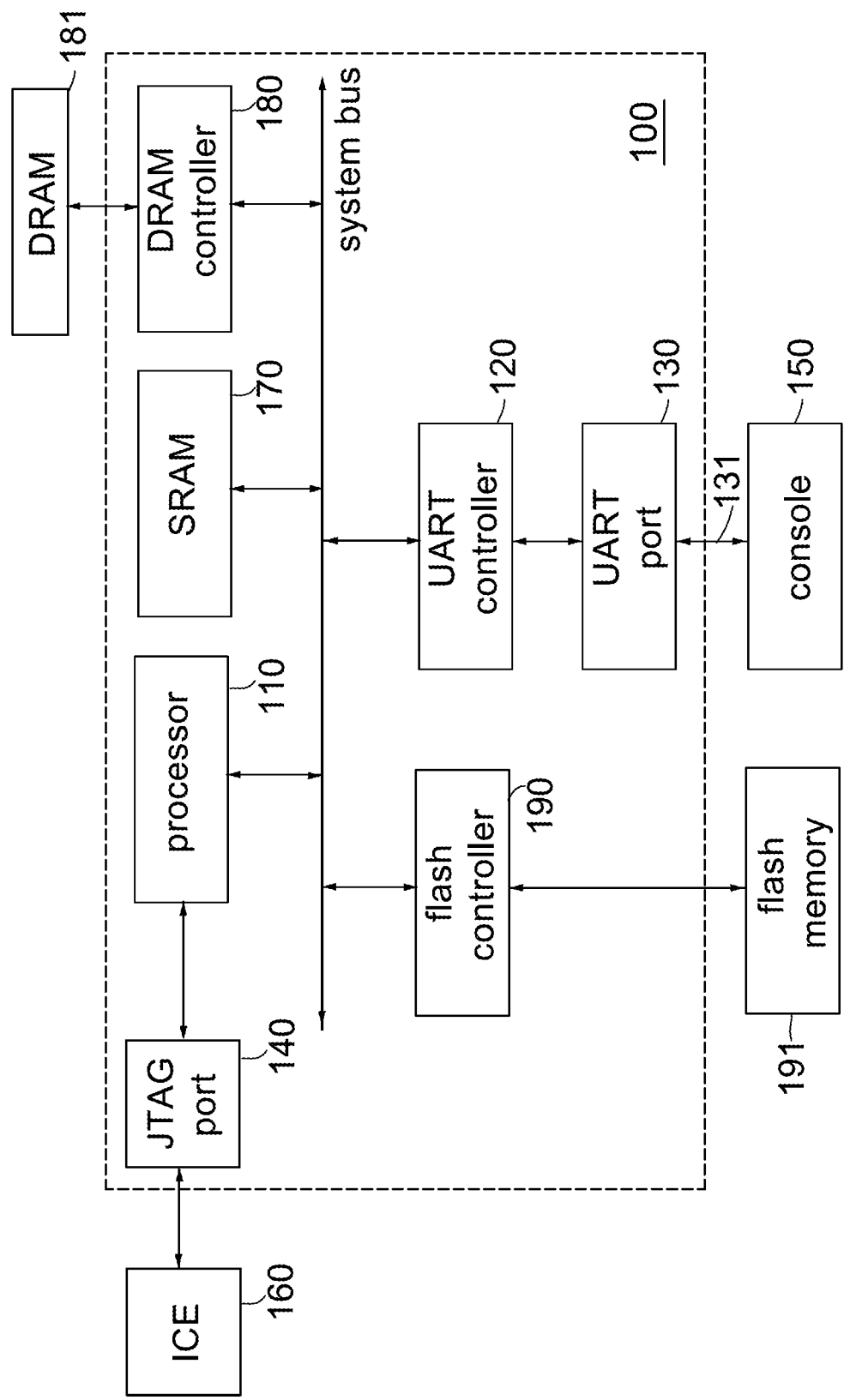
FIG. 1 is an exemplary diagram showing a conventional SOC.
Figure 2:
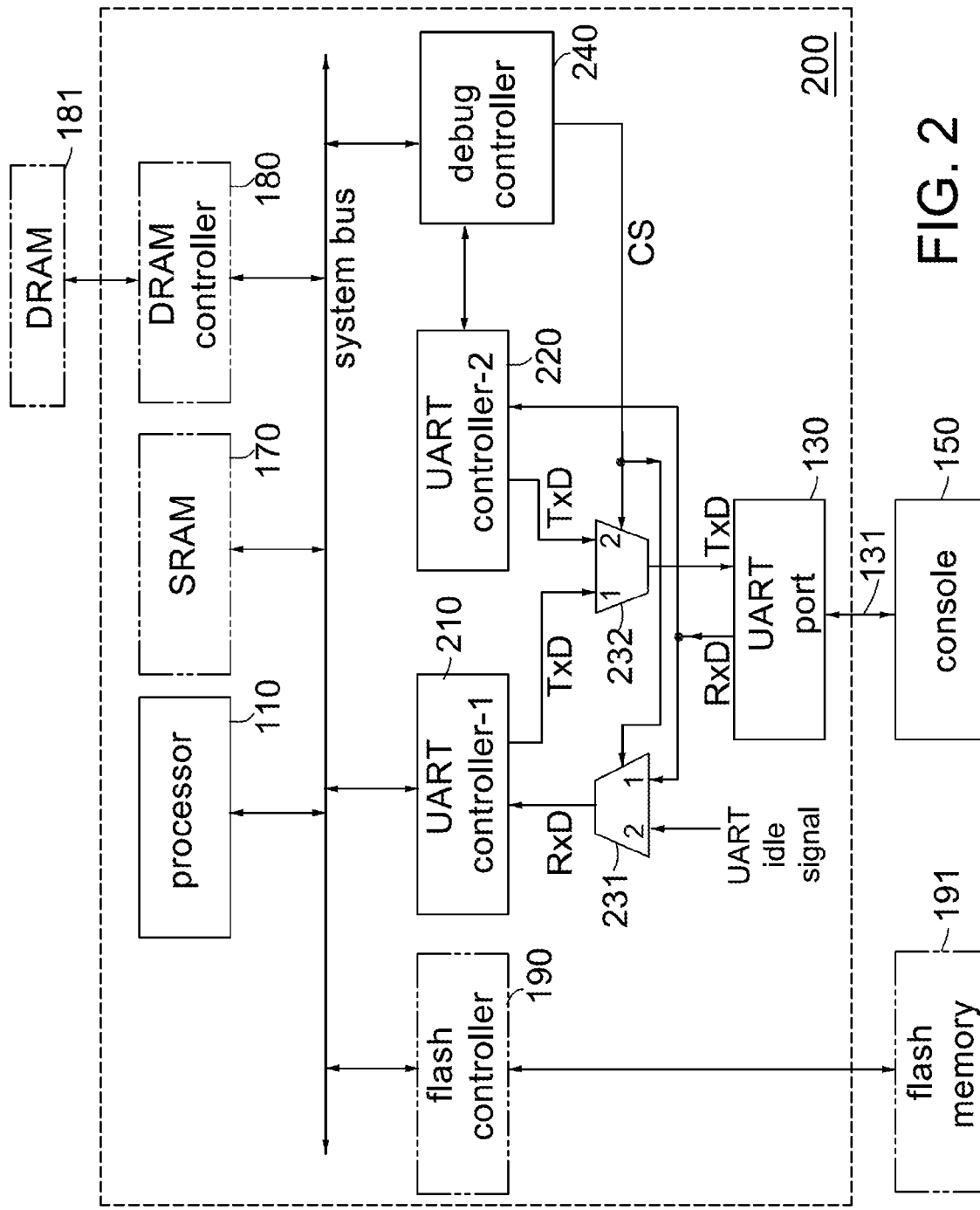
FIG. 2 is a schematic diagram showing a SOC according to an embodiment of the invention.

FIG. 2 is a schematic diagram showing a SOC according to an embodiment of the invention. Referring to FIG. 2, a SOC 200 of the invention includes a processor 110, a debug controller 240, a UART controller-1 210, a UART controller-2 220, two multiplexers 231, 232 and a UART port 130. It is noted that a SRAM 170, a DRAM controller 180, a separate DRAM 181, a flash controller 190 and a separate flash memory 191 are optional depending on different system needs and thus represented by dash-lines. The UART controller-1 210 and the UART controller-2 220 share the same UART port 130. Sharing the UART port 130 in the SOC 200 is advantageous to minimize the number of ports and maintain a small form factor.

After power-up or a hardware reset, the processor 110 carries out a reset sequence and then executes instructions according to a normal flow; besides, the debug controller 240 de-asserts a control signal CS or generates the control signal CS with a first state (e.g., logic 0), without parsing and executing any debug command. After system initialization, the baud rates of the UART controller-1 210 and the UART controller-2 220 are set to different values (kbps), such as R1 and R2, respectively. Each of the two multiplexers 231, 232 has two input terminals and one output terminal. As to the multiplexer 231, its first input terminal is connected with a data receiving pin RxD of UART port 130, its second input terminal is always applied with a UART idle signal (which is high-voltage or powered), and its output terminal is connected with the RxD pin of the UART controller-1 210. As to the multiplexer 232, its first input terminal is connected with the TxD pin of UART controller-1 210, its second input terminal is connected with the TxD pin of UART controller-2 220 and its output terminal is connected with a data transmission pin TxD of UART port 130. According to the state of the control signal CS, each of the two multiplexers 231, 232 selectively connects one of its two input terminals to its output terminal. After receiving the control signal CS with the first state (or the de-asserted control signal CS or logic 0), each of the multiplexer (231, 232) connects its first input terminal to its output terminal. Consequently, the RxD pin of the UART port 130 is coupled to the RxD pin of the UART controller-1 210 via the multiplexer 231, and the TxD pin of the UART port 130 is coupled to the TxD pin of the UART controller-1 210 via the multiplexer 232. Thus, the processor 110 can access the receiving and transmitting shift registers of the UART controller-1 210. Note that the data receiving pin RxD of the UART port 130 is also coupled to the RxD pin of the UART controller-2 220 for "snooping" (will be described below) as shown in FIG. 2. Accordingly, the debug controller 240 can also access the receiving shift register of the UART controller-2 220.

At this moment, a developer may connect an external device, such as the console 150, to the UART port 130 of the SOC 200 through a UART cable 131 for maintenance, monitoring or data transmission after setting the baud rate of the UART controller of the console 150 to R1. Serial communication between the UART controller-1 210 and a corresponding UART controller (not shown) of the console 150 is created if they have the same parameter settings. The parameter settings include, but not limited to, baud rate, data bits, stop bits, parity, and flow control. Since the data receiving pin RxD of the UART port 130 is also coupled to the RxD pin of the UART controller-2 220, the UART controller-2 220 can simultaneously receive input data through its RxD pin (called "snooping" in this specification) during the serial communication between the UART controller-1 210 and the UART controller of the console 150. Meanwhile, the debug controller 240 reads received data from the receiving shift register of the UART controller-2 220 and then checks whether the received data is equal to a predetermined keyword.

In a case of a processor crash, the developer sets the baud rate of the UART controller of the console 150 to R2 and then sends the predetermined keyword to the SOC 200. As soon as the debug controller 240 determines that the UART controller-2 220 receives the predetermined keyword, the debug controller 240 asserts the control signal CS (or generates the control signal CS with a second state (e.g., logic 1)) and starts parsing and executing debug commands. According to the control signal CS with the second state, each of the multiplexers 231, 232 connects its second input terminal to its output terminal. Accordingly, the UART idle signal (whose voltage is maintained above zero) is applied to the RxD pin of the UART controller-1 210 via the multiplexer 231, and the data transmission pin TxD of the UART port 130 is coupled to the TxD pin of the UART controller-2 220 via the multiplexer 232. Therefore, a new serial communication between the UART controller-2 220 and the UART controller of the console 150 is created. Besides, since the RxD pin of the UART controller-1 210 is applied with the UART idle signal, the data receiving pin RxD of the UART controller-1 210 was stopped (or gated or masked). According to the invention, the predetermined keyword is a random string. The longer the keyword, the better it is. For example, the predetermined keyword can be set to "gYjs15$6d7bat&j#". In a preferred embodiment, R2 is greater than R1. R2 greater than R1 can avoid the keyword alias when data is transferred to/from UART Controller-1 210 (i.e., the control signal CS with the first state). For example, when R1=38400 (kbps) and R2=115200 (kbps), it is impossible for the UART controller-1 210 (signal changed per 26 μs) to have the same waveform as the UART controller-2 220 (signal changed per 8.7 μs).

In response to the first state of the control signal CS, the first input terminal (coupled to the TxD pin of UART controller-1 210) of the multiplexer 232 is connected to its output terminal and thus UART controller-1 210 communicates with the UART controller of the console 150; accordingly, the processor 110 can access the receiving and transmitting shift registers of the UART controller-1 210. By contrast, in response to the second state of the control signal CS, the second input terminal (coupled to the TxD pin of UART controller-2 220) of the multiplexer 232 is connected to its output terminal and thus the UART controller-2 220 communicates with the UART controller of the console 150; accordingly, the debug controller 240 can access the receiving and transmitting shift registers of the UART controller-2 220. According to the invention, the debug controller 240 can be any controller or processor or CPU that at least has a command parsing function and a command execution function.

Table 1 below shows an exemplary debug command set according to an embodiment of the invention. Referring to Table 1, the debug command set is sent by the developer from the console 150 using a console application via the UART connection 131 to the debug controller 240 and is able to be parsed and executed by the debug controller 240. The debug command set is normally vendor-defined and is provided by way of example and not limitation of the invention.

TABLE 1

| debug commands | description |
|---|---|
| r [address] | Read data from address |
| w [address] [data] | Write data to address |
| d [address] [length] | Dump data from address with a data length |
| q | Quit parsing and executing debug command |

Figure 3:
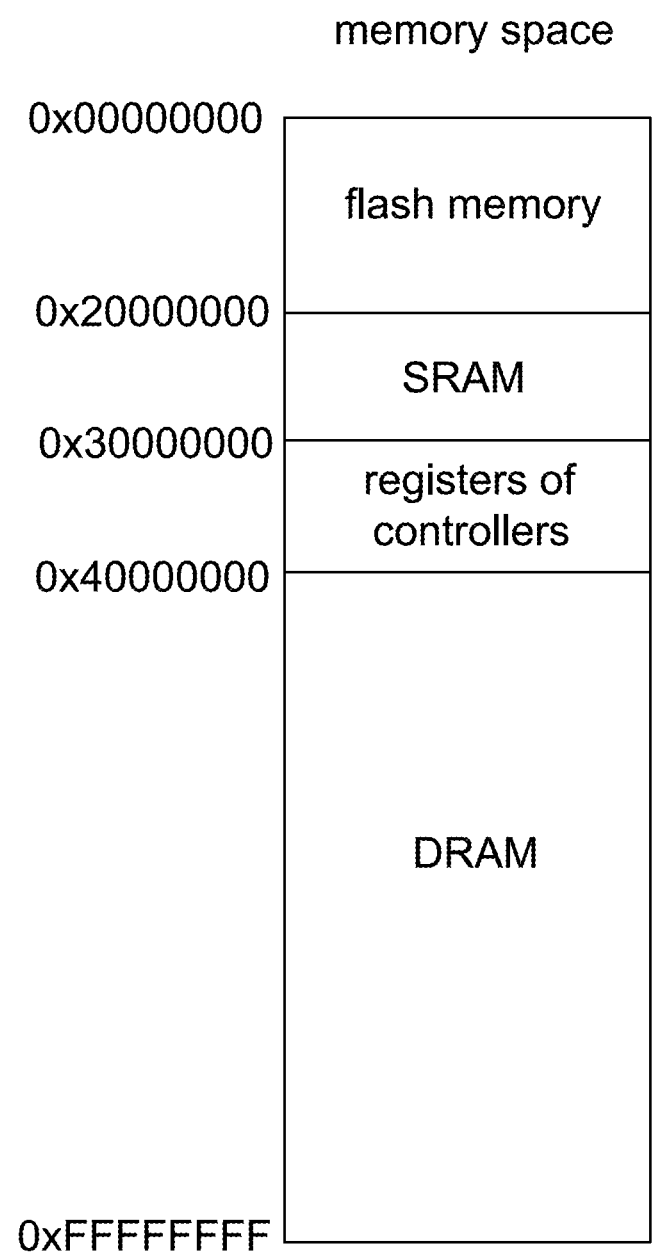
FIG. 3 is an exemplary memory space of the SOC 200.

FIG. 3 is an exemplary memory space of the SOC 200. In the embodiment of FIG. 3, an address range from 0x00000000 to 0x1FFFFFFF in the system memory space is allocated for the flash memory 191, an address range from 0x20000000 to 0x2FFFFFFF is allocated for the SRAM 170, an address range from 0x30000000 to 0x3FFFFFFF is allocated for registers of controllers 180, 190, 210, 220 and an address range from 0x40000000 to 0xFFFFFFFF is allocated for the DRAM 181. The sizes and the address ranges of the four regions in the SOC memory space are only utilized as embodiments and are not limitations of the invention. All addresses of accesses on system bus are located within the SOC memory space.

In the event of a processor crash, the processor 110 stops functioning properly. At this moment, the developer may issue various debug commands from the console 150 to the debug controller 240 via the UART connection 131 to cause the debug controller 240 to assert corresponding access commands on the system bus to the SOC memory space. For example, the developer may issue a "write" debug command (e.g., w 30000000 00000060) to cause the debug controller 240 to assert a "write" access command with a specified address (0x30000000) and a specified data (0x00000060) on the system bus so that the specified data (0x00000060) is written into the memory location (0x30000000). For another example, the developer may issue a "read" debug command (e.g., r 30000004) to cause the debug controller 240 to assert a "read" access command with a specified address (0x30000004) on the system bus so that the data stored in the memory location (0x30000000) is read and then sent back to the UART controller-2 220. For a further example, the developer may issue a "dump" debug command (e.g., d 30000000 100) to cause the debug controller 240 to assert two hundred and fifty-six (256) "read" access commands with different corresponding specified addresses (from 0x30000000 to 0x30000100) on the system bus so that the data stored in the memory locations (from 0x30000000 to 0x30000100) are read. In this manner, memory dump data in the address range of 0x30000000 to 0x30000100 can be accessed by the debug controller 240 through the system bus and then sent to the console 150 via the UART controller-2 220/the UART connection 131 for the human analysis and correction of problems related to the crash. Finally, while finishing memory dumping, the developer issues a "quit" debug command (e.g., q) to cause the debug controller 240 to stop parsing and executing any debug command, generate the control signal CS with the first state, and start checking whether the received data from the UART controller-2 220 is equal to the predetermined keyword. In this manner, the debug controller 240 helps the developer identify and fix bugs in the system when the crash occurs.

Figure 4A:
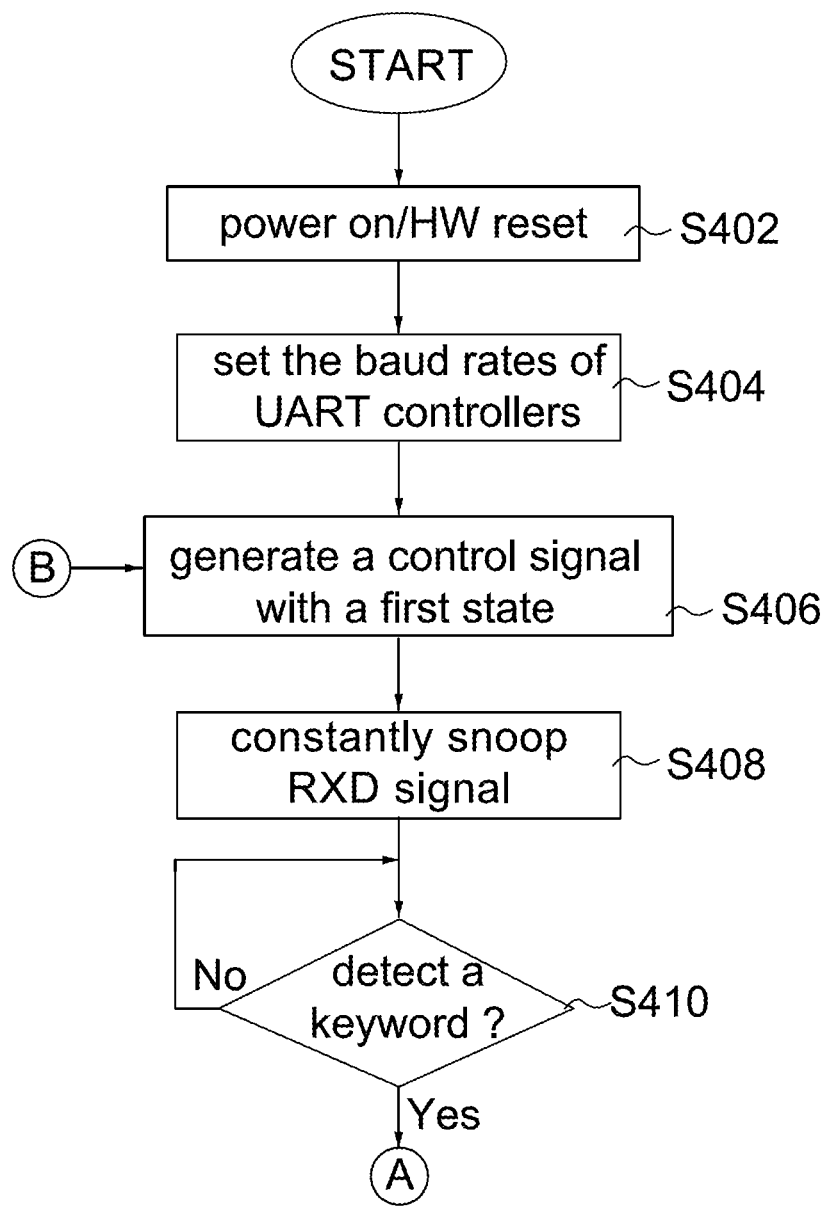
FIGS. 4A and 4B illustrate a flow chart showing an operating method of the SOC 200 according to an embodiment of the invention.
Figure 4B:
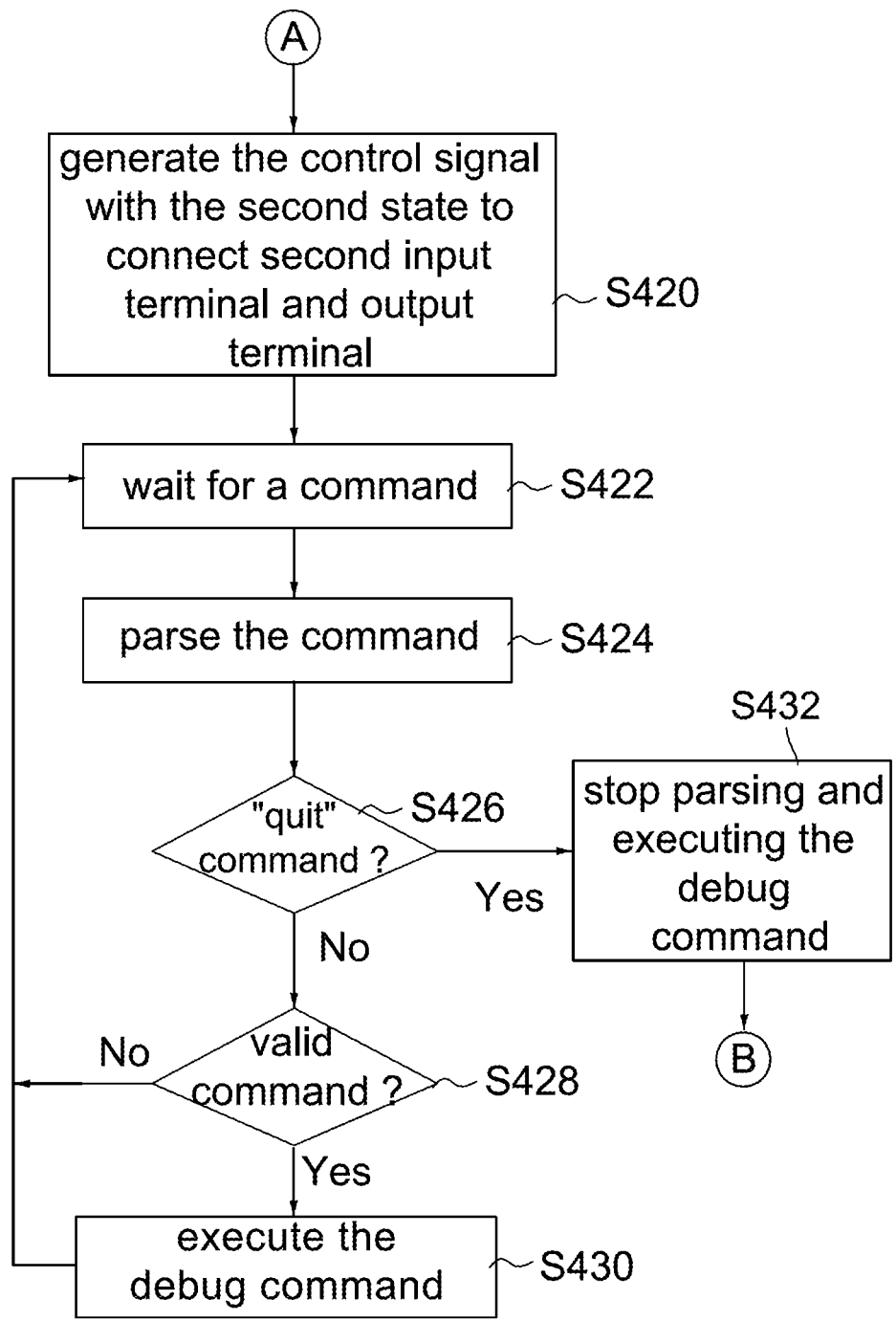

FIGS. 4A and 4B illustrate a flow chart showing an operating method of the SOC 200 according to an embodiment of the invention. Hereinafter, the operating method of the SOC 200 is described with reference to Table 1 and FIGS. 2, 3 and 4A-4B.

Step S402: Turn on power and de-assert the reset signal of the SOC 200.

Step S404: Set the baud rates of the UART controller-1 210 and the UART controller-2 220 to different values (kbps), such as R1 and R2, respectively.

Step S406: Generate the control signal CS with a first state to connect the first terminal of the multiplexer (231, 232) to its output terminal. After system initialization, the processor 110 executes instructions according to a normal flow; besides, the debug controller 240 de-asserts the control signal or generates the control signal CS with a first state (e.g., logic 0), without parsing and executing any debug command. According to the control signal CS with a first state, each of the multiplexer 231, 232 connects its first terminal to its output terminal. Thus, the data receiving pin RxD of the UART port 130 is coupled to the RxD pin of the UART controller-1 210 via the multiplexer 231, and the data transmission pin TxD of the UART port 130 is coupled to the TxD pin of the UART controller-1 210 via the multiplexer 232.

Step S408: The UART controller-2 220 constantly "snoops" input data through its RxD pin because its RxD pin is also coupled to the RxD pin of the UART port 130 as shown in FIG. 2. In the event of a processor crash, as previously described, the developer sets the UART controller of the console 150 to R2 and then sends the predetermined keyword to the RxD pin of the UART controller-2 220 via the UART port 130.

Step S410: Check whether an input data stream is equal to the predetermined keyword "gYjs15$6d7bat&j#". The debug controller 240 reads an input data stream from the receiving shift register of the UART controller-2 220 and then checks whether the input data stream from the UART controller-2 220 is equal to the predetermined keyword "gYjs15$6d7bat&j#". If Yes, go to step S420; otherwise, the flow stays at this step.

Step S420: The debug controller 240 asserts the control signal CS or generates the control signal CS with a second state (e.g., logic 1) to cause the multiplexer (231, 232) to connect its second input terminal to its output terminal. Accordingly, the UART idle signal is applied to the RxD pin of the UART controller-1 210 via the multiplexer 231, and the data transmission pin TxD of the UART port 130 is coupled to the TxD pin of the UART controller-2 220 via the multiplexer 232. Afterwards, the data receiving pin RxD of the UART controller-1 210 was stopped (or gated or masked); besides, a new serial communication between the UART controller-2 220 and the UART controller of the console 150 is created and thus the debug controller 240 can receive a debug command via the UART controller-2 220.

Step S422: The debug controller 240 waits for an input debug command from the console 150.

Step S424: The debug controller 240 parses the input debug command.

Step S426: The debug controller 240 determines whether it is a "quit" debug command. If YES, go to step S432; otherwise, go to step S428.

Step S428: The debug controller 240 determines whether it is a valid debug command. If Yes, go to step S430; otherwise, the flow goes to step S422.

Step S430: The debug controller 240 executes the debug command by asserting at least one corresponding access command on the system bus to the SOC memory space. Then, the flow goes to step S422.

Step S432: The debug controller 240 stops parsing and executing any debug command. Then, the flow goes to step S406.

On the other hand, the SOC 200 of the invention can be used to update its flash memory 191 using the debug controller 240, the flash controller 190 and the UART connection 131 after the debug controller 240 generates the control signal CS with the second state and starts parsing and executing the debug command.

Figure 5:
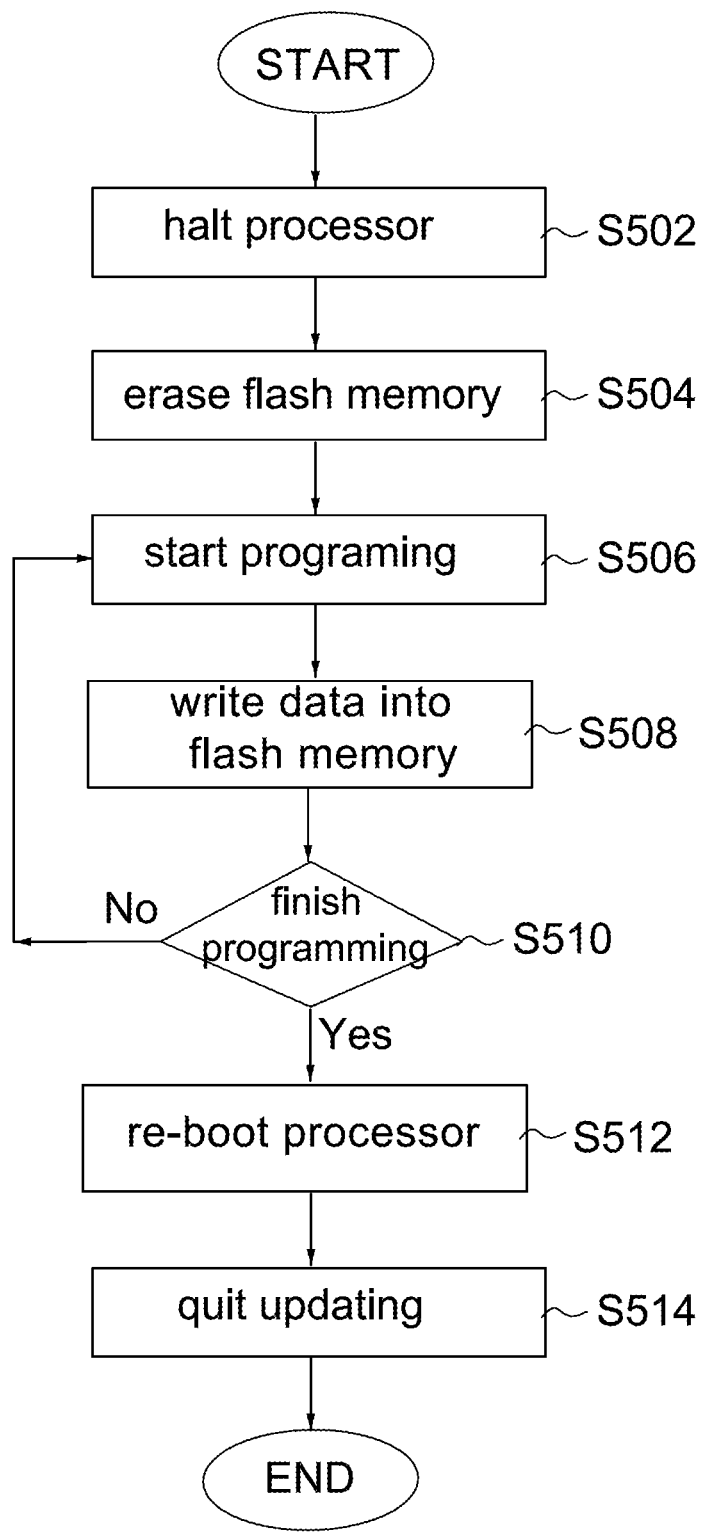
FIG. 5 is a flow chart showing a method of updating the flash memory 191 outside the SOC 200 according to another embodiment of the invention.

FIG. 5 is a flow chart showing a method of updating the flash memory 191 outside the SOC 200 according to another embodiment of the invention. Hereinafter, the method of updating the flash memory 191 outside the SOC 200 is described with reference to Table 1 and FIGS. 2, 3, 4A-4B and 5; for purpose of explanation, the flash controller 190 is a SPI flash controller and the flash memory 191 is a SPI flash memory. It should be noted that the SPI flash controller and the SPI flash memory are provided by way of explanation and not limitations of the invention. For purpose of explanation, regarding the SPI flash controller, assuming that (1) to enable a chip erase function, data 0x00000060 need to be written into the SPI flash controller register address 0x30000000; (2) to enable a write enable function, data 0x00000004 need to be written into its register address 0x30000000; (3) to enable a start page program function, data 0x??????02 need to be written into its register address 0x30000000; here, the number "??????" represents the starting address of program data; (4) to enable a page program data function, a total of 256-byte data are sequentially written into its register address 0x30000000. For purpose of explanation, regarding the processor 110, assuming that (1) to enable a halting function, data 0x00000001 need to be written into its register address 0x30000100; (2) to enable a re-booting function, data 0x00000000 need to be written into its register address 0x30000100. It is noted that the method of updating the flash memory 191 outside the SOC 200 begins after the debug controller 240 generates the control signal CS with the second state and starts parsing and executing the debug command.

Step S502: Halt the processor 110 temporarily. For example, the developer issues the "write" debug command (w 30000100 00000001) to the debug controller 240 for execution via the UART controller-2 220 to halt the processor 110 temporarily. This is to prevent the processor 110 from accessing the flash memory 191 during the period of updating.

Step S504: Erase the SPI flash memory. For example, the developer issues the "write" debug command (w 30000000 00000060) to the debug controller 240 for execution via the UART controller-2 220 to erase the whole SPI flash memory.

Step S506: Start programming the SPI flash memory. For example, the developer sequentially sends two "write" debug commands (w 30000000 00000004 and w 30000000 00010002) to the debug controller 240 for execution via the UART controller-2 220 to respectively enable a write enable function and a start page program function of the SPI flash controller.

Step S508: Write data into the SPI flash memory. For example, the developer sequentially sends two-hundred-fifty-six "write" debug commands (w 30000000 data-0; . . . ; w 30000000 data-255) to the debug controller 240 for execution via the UART controller-2 220 to sequentially write 256-byte data into the SPI flash memory.

Step S510: Check whether the programming is complete. If Yes, go to step S512; otherwise, the flow goes to step S506 for another page program.

Step S512: Re-boot the processor 110. For example, the developer sends the "write" debug command (w 30000100 00000000) to the debug controller 240 for execution via the UART controller-2 220 to re-boot the processor 110.

Step S514: Quit updating the SPI flash memory. For example, the developer sends the "quit" debug command to the debug controller 240 for execution via the UART-2 controller 220. It causes the debug controller 240 to stop parsing and executing any debug command, generate the control signal CS with the first state, and check whether the received data from the UART controller-2 220 is equal to the predetermined keyword (For example, the flow goes to step S432 of FIG. 4B).

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A System on Chip (SOC) comprising:
a first UART controller and a second UART controller having different baud rates;
a debug controller coupled to the second UART controller and a system bus for generating a control signal with a first state and checking whether a received data from the second UART controller is equal to a keyword after power-up or a hardware reset;
a UART port comprising a RxD pin and a TxD pin, wherein the RxD pin of the UART port is coupled to a RxD pin of the second UART controller;
a first multiplexer for coupling the RxD pin of the UART port to the RxD pin of the first UART controller in response to the first state of the control signal, and for coupling a voltage terminal applied with a UART idle signal to the RxD pin of the first UART controller in response to a second state of the control signal; and
a second multiplexer for coupling a TxD pin of the first UART controller to the TxD pin of the UART port in response to the first state of the control signal, and for coupling a TxD pin of the second UART controller to the TxD pin of the UART port in response to the second state of the control signal;
wherein when the received data from the second UART controller is equal to the keyword, the debug controller generates the control signal with the second state, and starts parsing and executing at least one debug command from the second UART controller.

2. The SOC according to claim 1, wherein a baud rate of the first UART controller is greater than a baud rate of the second UART controller.

3. The SOC according to claim 1, wherein an external console is coupled to the UART port.

4. The SOC according to claim 3, wherein when intending to cause the debug controller to parse and execute the debug command, the external console sets a baud rate of its UART controller to the baud rate of the second UART controller, and sends the keyword to the second UART controller.

5. The SOC according to claim 4, wherein after the keyword is sent, the external console issues the debug command to the second UART controller.

6. The SOC according to claim 1, wherein the debug command is selected from the group comprising a write debug command, a read debug command, a dump debug command and a quit debug command.

7. The SOC according to claim 6, further comprising:
a processor coupled to the first UART controller through the system bus.

8. The SOC according to claim 7, further comprising:
a flash controller coupled to the system bus and a separate flash memory;
wherein when the received data from the second UART controller is equal to the keyword, the processor is halted and the separate flash memory is updated via the flash controller by the debug controller according to a plurality of the write debug commands with a plurality of specified addresses.

9. The SOC according to claim 6, wherein when the debug command is the read debug command, the debug controller asserts a read access command with a specified address on the system bus, reads data from the specified address and sends the read data back to the second UART controller.

10. The SOC according to claim 6, wherein when the debug command is the write debug command, the debug controller asserts a write access command with a specified address and a specified data on the system bus to write the specified data into the specified address.

11. The SOC according to claim 6, wherein when the debug command is the dump debug command, the debug controller asserts a plurality of read access commands with a series of specified addresses on the system bus, reads a data stream from the series of specified addresses and sends the read data stream back to the second UART controller.

12. The SOC according to claim 6, wherein when the debug command is the quit debug command, the debug controller stops parsing and executing any debug command, generates the control signal with the first state and starts checking whether the received data from second UART controller is equal to the keyword.

13. The SOC according to claim 1, wherein a voltage of the UART idle signal is maintained above zero.

14. An operating method of a System on Chip (SOC) comprising a first UART controller, a second UART controller, a debug controller, and a UART port, wherein the debug controller is coupled to the second UART controller and a system bus, and a RxD pin of the UART port is coupled to a RxD pin of the second UART controller, the operating method comprising the steps of:
setting a first baud rate of the first UART controller and a second baud rate of the second UART controller to different rates;
coupling a RxD of the first UART controller to the RxD pin of the UART port;
coupling a TxD of the first UART controller to a TxD pin of the UART port;
checking whether a received data from the second UART controller is equal to a keyword by the debug controller; and
when the received data is equal to the keyword, applying a UART idle signal to the RxD pin of the first UART controller, coupling a TxD pin of the second UART controller to the TxD pin of the UART port, and starting parsing and executing at least one debug command from the second UART controller by the debug controller.

15. The method according to claim 14, wherein the second baud rate is greater than the first baud rate.

16. The method according to claim 14, further comprising:
first, coupling the UART port to an external console;
next, setting a baud rate of a UART controller of the external console to the second baud rate; and
next, sending the keyword to the second UART controller by the external console; and
next, sending the debug command to the second UART controller by the external console.

17. The method according to claim 14, wherein the debug command is selected from the group comprising a write debug command, a read debug command, a dump debug command and a quit debug command.

18. The method according to claim 17, wherein the SOC further comprises a processor coupled to the first UART controller through the system bus.

19. The method according to claim 18, further comprising:
first, halting the processor by the debug controller according to the write debug command with a first specified address and first specified data;
next, erasing a separate flash memory via a flash controller by the debug controller according to the write debug command with a second specified address and second specified data;
next, starting programming the separate flash memory via the flash controller by the debug controller according to the write debug command with the second specified address and third specified data;
next, writing a data stream into the separate flash memory via the flash controller by the debug controller according to at least one write debug command with the second specified address;
next, re-booting the processor by the debug controller according to the write debug command with the first specified address; and
next, stopping parsing and executing any debug command, generating the control signal with the first state and starting checking whether the data from second UART controller is equal to the keyword by the debug controller according to the quit debug command;
wherein the SOC further comprises the flash controller.

20. The method according to claim 17, wherein the step of starting parsing and executing further comprises:
when the debug command is the read debug command, asserts a read access command with a specified address on the system bus, reading data from the specified address and sending the read data back to the second UART controller by the debug controller.

21. The method according to claim 17, wherein the step of starting parsing and executing further comprises:
when the debug command is the write debug command, asserting a write access command with a specified address and a specified data on the system bus to write the specified data into the specified address by the debug controller.

22. The method according to claim 17, wherein the step of starting parsing and executing further comprises:
when the debug command is the dump debug command, asserting a plurality of read access commands with a series of specified addresses on the system bus, reading a data stream from the series of specified addresses and sending the read data stream back to the second UART controller by the debug controller.

23. The method according to claim 17, wherein the step of starting parsing and executing further comprises:
when the debug command is the quit debug command, generating the control signal with the first state, stopping parsing and executing any debug command, and starting checking whether the received data from second UART controller is equal to the keyword by the debug controller.

24. The method according to claim 14, wherein a voltage of the UART idle signal is maintained above zero.

* * * * *